(12) United States Patent
Bonner et al.

(10) Patent No.: US 8,935,612 B2
(45) Date of Patent: Jan. 13, 2015

(54) DATA REPLICATION TRACING

(75) Inventors: Andrew David Bonner, Thornton, CO (US); Scott M Airhart, Arvada, CO (US); Scott Bacon, Thornton, CO (US); Brandon J. Rodgers, Arvada, CO (US)

(73) Assignee: Sybase, Inc., Dublin, CA (US)

( * ) Notice: Subject to any disclaimer, the term of this patent is extended or adjusted under 35 U.S.C. 154(b) by 959 days.

(21) Appl. No.: 12/755,724

(22) Filed: Apr. 7, 2010

(65) Prior Publication Data

US 2011/0252124 A1    Oct. 13, 2011

(51) Int. Cl.
  G06F 15/177    (2006.01)
  G06F 17/00     (2006.01)
  H04L 29/08     (2006.01)

(52) U.S. Cl.
  CPC ................................ *H04L 67/1095* (2013.01)
  USPC ............................ 715/734; 707/638; 707/610

(58) Field of Classification Search
  None
  See application file for complete search history.

(56) References Cited

U.S. PATENT DOCUMENTS

| | | | |
|---|---|---|---|
| 6,321,234 B1 | 11/2001 | Debrunner | |
| 7,206,790 B2 * | 4/2007 | Kodama | 1/1 |
| 7,805,407 B1 * | 9/2010 | Verbeke et al. | 707/634 |
| 2006/0184410 A1 * | 8/2006 | Ramamurthy et al. | 705/8 |
| 2008/0034014 A1 | 2/2008 | Beck et al. | |
| 2008/0077624 A1 * | 3/2008 | Holden et al. | 707/200 |
| 2009/0132936 A1 * | 5/2009 | Anderson et al. | 715/762 |
| 2010/0031247 A1 * | 2/2010 | Arnold et al. | 717/174 |

OTHER PUBLICATIONS

Sybase Control Center 3.1, Product Data Sheet, Sybase, Mar. 24, 2010, 4 pgs.
Sybase Control Center 3.1—VPAT, Voluntary Product Assessment Template for Sybase Control Center 3.1, Sybase, Mar. 18, 2010, 5 pgs.
Sybase Control Center 3.1 Release Bulletin: Documents known changes to installation, documentation, and functionality for Sybase Control Center 3.1, Sybase, Mar. 18, 2010, 20 pgs.
Sybase Control Center 3.0, Product Data Sheet, Sybase, Aug. 27, 2009, 4 pgs.
Sybase Control Center 3.0 VPAT, Voluntary Product Assessment Template for Sybase Control Center 3.0, Jul. 15, 2009, 5 pgs.
Bergin, C. et al., Evolution of Systems Management at Sybase: Introducing Sybase Control Center, Power Point presentation given at Techwave 2008 Sybase User Training & Solutions Conference, 39 pages.
Garbus, J., Database Encryption Design Considerations and Best Practices for ASE 15, presentation from Sep. 16, 2009, Copyright 2009, 6 pages.
C.J. Date, *An Introduction to Database Systems*, 7$^{th}$ Edition, Addison-Wesley, 2000, the whole book.

* cited by examiner

*Primary Examiner* — Matt Kim
*Assistant Examiner* — Mahelet Shiberou
(74) *Attorney, Agent, or Firm* — Sterne, Kessler, Goldstein & Fox, P.L.L.C.

(57) ABSTRACT

System, method, computer program product embodiments and combinations and sub-combinations thereof for data replication tracing are provided. In an embodiment, the data replication tracing includes identifying a replication environment within a multi-tier infrastructure of an enterprise data processing network, and monitoring operational performance within the replication environment. A path is rendered on a topology to display data flow for the replication environment based upon a configuration of the replication environment. The data flow may be represented relative to a target data node, relative to a source data node, and/or relative to a replication server.

22 Claims, 6 Drawing Sheets

| Primary MO | Secondary MO | Relation | Notes |
|---|---|---|---|
| NY_RepServer | NYEX.TradeDB | child | Normal parent/child relationship |
| NY_RepServer | NYRS.LonRS | child | Normal parent/child relationship |
| London_RepServer | LondonEX.TradeDB | child | Normal parent/child relationship |
| London_RepServer | NYRS.LonRS | associate | Provides means of traversing topology "upstream" from RepServer to non-child route |
| NYEX.TradeDB | NY_Exchange | associate | Provides relationship from connection to non-parent/child MO |
| LondonEX.TradeDB | London_Exchange | associate | Provides relationship from connection to non-parent/child MO |

FIG. 4

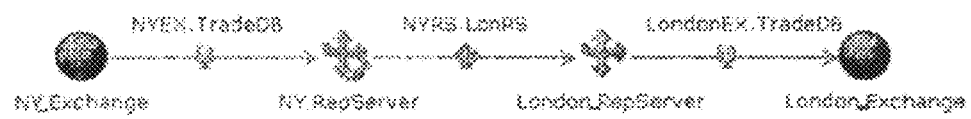

FIG. 5

DATA REPLICATION TRACING

BACKGROUND

1. Field of the Invention

The present invention relates generally to data processing environments and, more particularly, to a system providing methodology for data replication tracing.

2. Background Art

Computers are very powerful tools for storing and providing access to vast amounts of information. Computer databases are a common mechanism for storing information on computer systems while providing easy access to users. A typical database is an organized collection of related information stored as "records" having "fields" of information. As an example, a database of employees may have a record for each employee where each record contains fields designating specifics about the employee, such as name, home address, salary, and the like.

Between the actual physical database itself (i.e., the data actually stored on a storage device) and the users of the system, a database management system or DBMS is typically provided as a software cushion or layer. In essence, the DBMS shields the database user from knowing or even caring about the underlying hardware-level details. Typically, all requests from users for access to the data are processed by the DBMS. For example, information may be added or removed from data files, information retrieved from or updated in such files, and so forth, all without user knowledge of the underlying system implementation. In this manner, the DBMS provides users with a conceptual view of the database that is removed from the hardware level. The general construction and operation of database management systems is well known in the art. See e.g., Date, C., "An Introduction to Database Systems, Seventh Edition", Addison Wesley, 2000.

Increasingly, businesses run mission-critical systems which store information on database management systems. Each day more and more users base their business operations on mission-critical systems which store information on server-based database systems, such as Sybase® Adaptive Server® Enterprise (ASE) (available from Sybase, Inc. of Dublin, Calif.). As a result, the operations of the business are dependent upon the availability of data stored in their databases. Because of the mission-critical nature of these systems, users of these systems need to protect themselves against loss of the data due to software or hardware problems, disasters such as floods, earthquakes, or electrical power loss, or temporary unavailability of systems resulting from the need to perform system maintenance.

One well-known approach that is used to guard against loss of critical business data maintained in a given database (the "primary database") is to maintain one or more standby or replicate databases. A replicate database is a duplicate or mirror copy of the primary database (or a subset of the primary database) that is maintained either locally at the same site as the primary database, or remotely at a different location than the primary database. The availability of a replicate copy of the primary database enables a user (e.g., a corporation or other business) to work with a copy of the database in the event of the loss, destruction, or unavailability of the primary database.

Replicate database(s) are also used to facilitate access and use of data maintained in the primary database (e.g., for decision support and other such purposes). For instance, a primary database may support a sales application and contain information regarding a company's sales transactions with its customers. The company may replicate data from the primary database to one or more replicate databases to enable users to analyze and use this data for other purposes (e.g., decision support purposes) without interfering with or increasing the workload on the primary database. The data that is replicated (or copied) to a replicate database may include all of the data of the primary database such that the replicate database is a minor image of the primary database. Alternatively, only a subset of the data may be replicated to a given replicate database (e.g., because only a subset of the data is of interest in a particular application).

In recent years, the use of replication technologies has been increasing as users have discovered new ways of using copies of all sorts of data. Various different types of systems, ranging from electronic mail systems and document management systems to data warehouse and decision support systems, rely on replication technologies for providing broader access to data. Over the years, database replication technologies have also become available in vendor products ranging from simple desktop replication (e.g., between two personal computers) to high-capacity, multi-site backup systems.

Knowledge of how data flows through an enterprise is very important, yet increasingly difficult in today's complex environments, particularly as these modern enterprises often contain data being replicated to and from hundreds of servers and databases with thousands of tables and stored procedures. The size and complexity of these environments, plus an ever-changing workforce, can result in situations where the details of data flow through the environment are not immediately known. These details can be difficult and time consuming to track down by current methods of examining the configuration of the replication environment, thus making the maintenance of a comprehensive knowledge of the enterprise's data flow next to impossible.

Accordingly, a need exists for a manner of tracing replication to provide a clear and accurate portrait of how data is flowing through an enterprise's systems. The present invention addresses such a need.

BRIEF SUMMARY

Briefly stated, the invention includes system, method, computer program product embodiments and combinations and sub-combinations thereof for data replication tracing. In an embodiment, the data replication tracing includes identifying a replication environment within a multi-tier infrastructure of an enterprise data processing network, and monitoring operational performance within the replication environment. A path is rendered on a topology to display data flow for the replication environment based upon a configuration of the replication environment. The data flow may be represented relative to a target data node, relative to a source data node, and/or relative to a replication server.

Further embodiments, features, and advantages of the invention, as well as the structure and operation of the various embodiments of the invention, are described in detail below with reference to accompanying drawings.

BRIEF DESCRIPTION OF THE DRAWINGS/FIGURES

The accompanying drawings, which are incorporated herein and form part of the specification, illustrate embodiments of the present invention and, together with the description, further serve to explain the principles of the invention and to enable a person skilled in the relevant art(s) to make and use the invention.

FIG. 4 illustrates a diagram of the relationship definitions that are needed to create and generate the topology data for an example environment in accordance with an embodiment of the invention.

FIG. 5 illustrates a topology displaying the managed objects for the example environment of FIG. 4.

Figure 1:
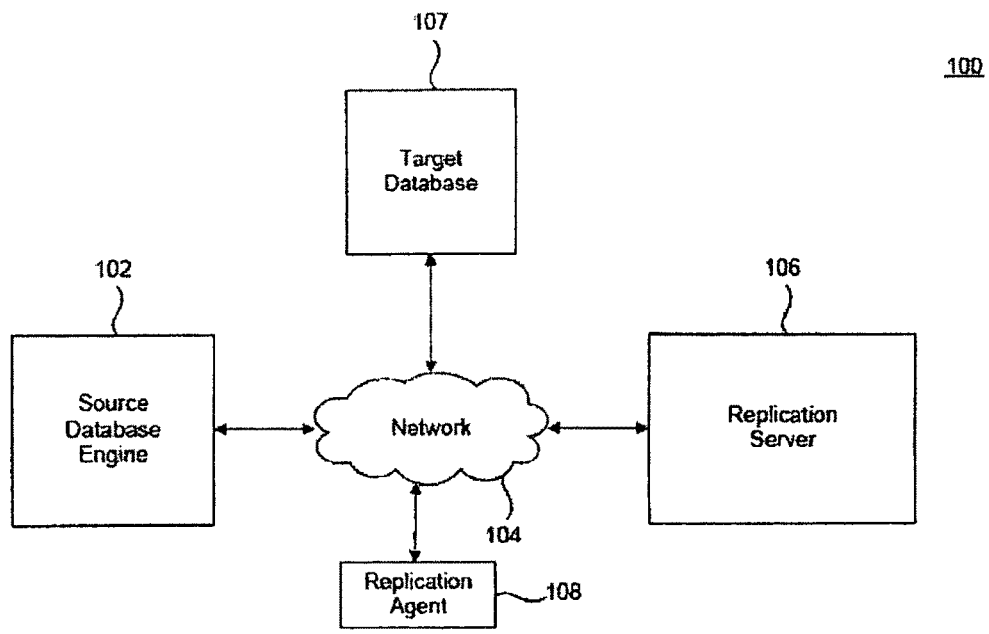
FIG. 1 illustrates a typical network for data replication.

The features and advantages of the present invention will become more apparent from the detailed description set forth below when taken in conjunction with the drawings. In the drawings, like reference numbers generally indicate identical, functionally similar, and/or structurally similar elements. Generally, the drawing in which an element first appears is indicated by the leftmost digit(s) in the corresponding reference number.

DETAILED DESCRIPTION

The present invention relates to a system, method, computer program product embodiments and combinations and sub-combinations thereof for providing methodology for data replication tracing.

The following definitions are offered for purposes of illustration, not limitation, in order to assist with understanding the discussion that follows.

GLOSSARY

Collection set: A set of performance statistics, gathered at a specified interval and for a specified length of time.

Component: A server object in a replication environment. Examples of components are connections, routes, and Replication Agent threads.

Connection: A connection from a Replication Server to a database.

Database: A set of related data tables and other objects that are organized and presented to serve a specific purpose.

Data server: A server that provides the functionality necessary to maintain the physical representation of a replicated table in a database. An example of a data server is Sybase Adaptive Server.

Edge: A topology object representing relationship(s) between two nodes, displayed in the form of a line that connects the topology node icons, where one line can represent multiple connections, such as between a replication server and a data server. Edges in a replication topology are defined with a direction that indicates the flow of data between nodes.

Environment: A set of servers that interact to perform replication. It can be a subset of the replication domain identified by the ID server.

ID Server: One specific replication server in a replication system. It assigns unique ID numbers to every other replication server and database in the system and maintains the version information for the system.

Node: A topology object representing a server or other entity type, displayed visually in the form of an icon.

Replication: A process by which the changes to the data in one database, including creation, updating, and deletion of records, are applied to another database.

Replication path: The set of all servers and internal components, such as replication connections and routes, that transactions travel through when moving from the primary to the replicate database.

Topology: A graphical representation of how the servers in a replication environment are connected to each other. It is a network diagram that provides a visual map of the availability of the replication environment.

Referring now to FIG. 1, a typical network 100 where a source database engine 102 is able to communicate over network 104 with replication server 106 via replication agent 108 is represented. Network 104 can be any type of network or combination of networks such as, but not limited to, a local area network, wide area network, or the Internet. Network 104 may be any form of a wired network or a wireless network, or a combination thereof.

Also in communication over network 104 is a replication agent 108. The replication agent 108 facilitates the replication process by, in accordance with an embodiment of the present invention, scanning a transaction log for changes at source database engine 102 and sending those changes to replication server 106. One skilled in the relevant arts will further recognize that the network 100 can be configured in a number of ways in order to achieve the same result, and the aforementioned configuration is shown by way of example, and not limitation. For instance, in accordance with an embodiment of the present invention, replication agent 108 and source database engine 102 are located in a single physical computing device or cluster of computing devices.

Source database engine 102 comprises a source database and a transaction log, in accordance with an embodiment of the present invention. Every transactional operation, including inserts, updates, and deletes to the database, causes a log record to be written to the transaction (primary) log, which is commonly referred to simply as the "log." (For further information on logging operations in a database system, see e.g., U.S. Pat. No. 6,321,234 titled "Database server system with improved methods for logging transactions"). Each particular log record characterizes the change which has occurred to the primary database 102 during processing of a transaction. These log records can be used, for instance, in error recovery, to restore the database 102 to a preexisting, consistent state.

In a traditional log-based replication system, changes to the source database 102 are sent to replication server 106 over network 104, which then applies these changes, over network 104, directly to target database 107. As example of such a system is described in U.S. patent application Ser. No. 11/309,387, publication no. 20080034014, entitled "Replication System with Methodology for Replicating Stored Procedure Calls", and assigned to the assignee of the present invention. As is commonly understood, the replication server 106 starts DSI threads, which are responsible for transferring the data from an outbound queue to the target database 107.

Figure 2:
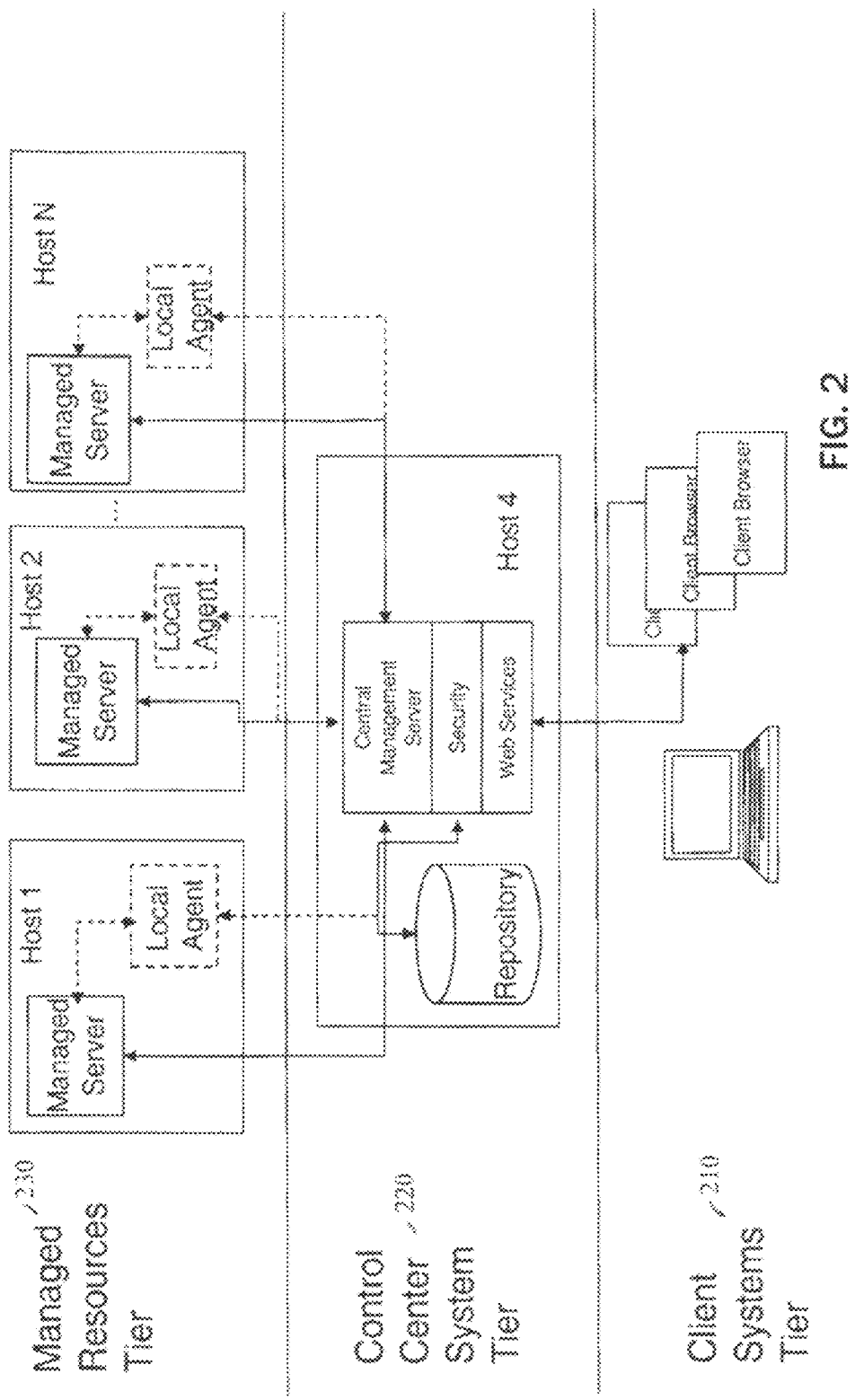
FIG. 2 illustrates a block diagram representation of a system for replication tracing in accordance with an embodiment of the invention.

In accordance with an embodiment of the invention, the data flow through a replication environment is capably and efficiently traced. Referring now to FIG. 2, a block diagram of a system for replication tracing in accordance with an embodiment of the invention is represented. In general, the present invention performs replication tracing through a multi-tier infrastructure including a client systems tier 210, a control center system tier 220, and a managed resources tier 230, where the control system tier 220 provides a server application that uses a Web-browser-based client in the client system tier 220 to deliver an integrated solution for monitoring and managing the resources of the managed resource tier 230. The client systems tier 210 is the entry-point for selecting monitoring, including replication tracing in accordance with an embodiment of the invention, of the managed resources of the managed resources tier 230 via a Web browser on the client system(s) which communicates with the control server of the control center system tier 220 via a gateway, such as an HTTP server and its components for performing bi-directional communication with the client browsers (e.g., Internet Explorer, FireFox, etc.), as is well understood in the art. The host(s) of the managed resources tier 230 suitably represent the systems, such as database systems, replication servers, etc., within an enterprise that are being monitored by the control center system tier 220 directly or optionally via local agents that plug-in to the control center system tier 220. By way of example, Sybase Control Center available from Sybase Inc. of Dublin, Calif. running on a Blade Server with a platform, such as Linux x86-64, HP Itanium, Sun Solaris Sparc, Windows XP, and built on the Adobe Flex technology specifically designed for developing rich Internet applications (RIAs), may be used to provide the functionality of the control center system tier 220. The client systems tier 210 level represents the computer processing systems, including but not limited to, workstations, laptops, handheld devices, etc., that are capable of running a standard Internet web browser with an Adobe Flash Player plug-in, as well understood in the art.

With this system arrangement, a single comprehensive Web administration console of the control center system tier 220 manages real-time performance, status, and availability monitoring of large-scale, geographically dispersed data processing networks, combining a rich client administrative console, agents, common services, and tools in order to provide historical monitoring, threshold-based alerts and notifications, and intelligent tools for identifying performance and usage trends While the central control system tier 220 can be utilized for myriad monitoring, reference is being made to a replication environment as the managed resources tier 230. In accordance with embodiments of the invention, replication tracing provides the information needed to determine the target, source, and path of data flow anywhere in the replication environment. The tracing allows ready determination of where is the data being replicated to (target tracing), where the data comes from (source tracing), and/or what the impact is to replication if a particular replication server is down (replication server tracing). Thus, when troubleshooting, target replication tracing determines the downstream flow of data from the database server in question, quickly and accurately identifying the data's final destination to assist in determining the applications and users to be affected by any downtime. Source replication tracing follows the flow of data upstream, from the database server in question, quickly and accurately identifying the data's origin, such as to help troubleshoot any errors reported by an application user. Replication server tracing identifies all replication paths flowing through a replication server in question, quickly and accurately identifying all the associated servers involved, such as to assist in determining the applications and users to be affected by any downtime.

Figure 3:
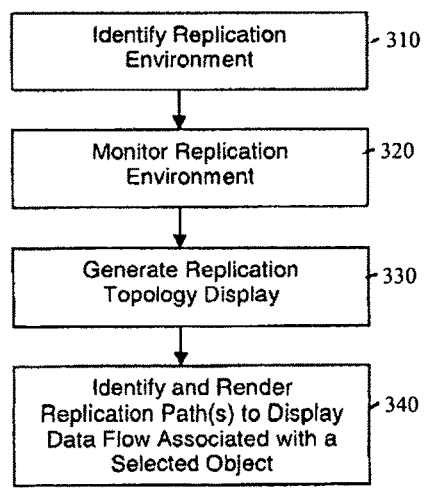
FIG. 3 is a flowchart illustrating an overall process for tracing replication in accordance with an embodiment of the invention.

FIG. 3 illustrates a block flow diagram corresponding to a method for tracing data flow in a replication environment in accordance with an embodiment of the invention. It should be appreciated that although the process is represented as separate acts in the block flow diagram, this is meant as illustrative and not restrictive of the processing flow.

The process includes identifying a replication environment within a multi-tier infrastructure of an enterprise data processing network (block 310), and monitoring operational performance within the replication environment (block 320). A replication topology display is then generated (block 330), as will be described more fully herein below. The rendering of a replication path follows based upon a configuration of the replication environment to trace data flow associated with a selected object of the topology (block 340), i.e., tracing replication connections between replication servers and data servers and routes between replication servers. In accordance with an embodiment, the rendering is independent of the status and/or performance of any individual server or component in the environment, since, for troubleshooting, tracing must work when servers are down, as well as when they are up and running normally.

In order to monitor a replication environment, the servers within that environment need to be established to the server application of the control center system tier 220, including supplying network and login information, and optionally identify the business applications that the server participates in (e.g. Trading, Sales, etc.) and the geographic locations. The server information may be gathered from an appropriate source, such as an interfaces file, or entered manually by the user, as is well appreciated by those skilled in the art.

Once servers are established, a user can monitor their operational performance. In accordance with an embodiment, the monitoring offers more information then if the server is 'up' or 'down', providing statistics for each server to help the user identify potential problems, and performance issues.

The availability status and statistics are collected from all of the servers in the environment, including directly from the managed server, for storage in the repository along with the date and time when collected. This includes saving all of the information on connections, routes, queues, and replication paths. As is described herein, this information is used when displaying replication topology views and performing replication tracing.

In an embodiment, availability statistics are continuously collected at a specified interval for each server in the replication environment. Since, over time, this process will generate a significant amount of data, the availability statistics can be aggregated after a specified amount of time, such as by averaging, summation, min/max, etc., to minimize repository storage requirements, e.g., data that was more then a week old might be condensed down to every hour, data that is a month old might be condensed down to every day, etc., as is well appreciated by those skilled in the art. Use of a page display allows the user, at a glance, to view the availability of servers, which can include the state of the server, and connections, routes, and rep agents, and some high-level performance statistics such as stable device usage, CPU utilization, etc. If it happens that only a subset of the servers have been established, (for example, if a destination replication server has not been added), then the status of any route to that server cannot be completely defined, but whatever information is available can be used to determine the status, with an appropriate notification to the user that information is incomplete.

Through the invention, the displaying of monitored operational performance is provided in a manner that allows an intuitive representation with the rendering of data flow. Replication environments are described using a topology view where the flow of data is illustrated by linking server icons together In an embodiment, the rendering of the data flow initiates upon a trigger occurrence. For example, launching can be triggered as a response to a user input on a GUI (graphical user interface) of the application, such as a right-click gesture of a chosen managed object (MO) of the replication environment to display its context menu and selection of one of the context menu choices. In an embodiment, the choices include three types of replication tracing, target, source, and server. With the topology view generated first, a user who may want to display the topology of a replication server just for the purpose of monitoring the overall status of their replication environment can do so. The user then may gesture on one of the nodes displayed in the topology, e.g., database server or replication server, to generate the replication tracing for that node.

In general, when a server or other top-level entity is added for monitoring, a top-level MO and its corresponding child MOs are created, such that as each child MO is created, the parent/child relationship is also created in the repository. In addition, relationships to the top-level MO and its children, other than parent/child relations, may need to be created to completely define the topology in which the top-level MO participates. These other types of relationships are defined as associate relations and are also created in the repository.

By way of example, suppose a simple replication server environment contains a Replication Server, "NY_RepServer", with a connection to an ASE Server, "NY Exchange" containing a database, "TradeDB", and a route to a Replication Server, "London RepServer" with a connection to an ASE Server, "London_Exchange" containing a database, "TradeDB".

FIG. 4 illustrates a diagram 400 of the relationship definitions that are needed to create and generate the topology data for this example environment. In an embodiment utilizing SCC, these relationships can be defined in the product module agent plugin using the SCCApplication's addManagedObjectRelation method, e.g.,

```
sccApp.addManagedObjectRelation(rsMO.getGuid( ),
    childMO.getGuid( ),
        SccServiceMBean.managedObjectRelation.CHILD);
```

To create a topology from the relationship, a hierarchy is built and returned in XML format, with topology nodes and edges represented by managed object guids (globally unique identifiers). Starting from a graph element for a topology node, the relations are walked and edge elements built, going back recursively and processing the found child/associated nodes, as is well understood in the art. In addition to the definitions of nodes and edges, the replication paths are identified and defined in the XML as an ordered set of nodes, for use in generating the topology display. The server ids in the path definition correspond to the node ids and are ordered in the direction of data flow.

By way of example, the following suitably represents the XML returned for the example environment:

```
<Graph>
    <Node id="1704DE5D1C004FA2AD97D03CFC41A4C7"
        nodeName="NY RepServer"
        nodeDescription="Replication Server 15.0"/>
    <Node id="9401F983DFA143C4AE763FF0C739E62D"
        nodeName="NY Exchange"
        nodeDescription="Adaptive Server Enterprise 15.1"/>
    <Node id="AF61FD7FFE554B9EA09F44550C4B9665"
        nodeName="London RepServer"
        nodeDescription=" Replication Server 15.0"/>
```

-continued

```
    <Node id="E62E9FAEEAF94C789BEC9CFF391C5EDB"
        nodeName="London Exchange"
        nodeDescription=" Adaptive Server Enterprise 15.1"/>
    <Edge id="DEB639E956944B4DB418EC8DEBD58D80"
        fromID="9401F983DFA143C4AE763FF0C739E62D"
        toID="1704DE5D1C004FA2AD97D03CFC41A4C7"
        edgeLabel="NYEX.TradeDB"
        edgeClass="Replication Server Connection"
        edgeIcon="RepServerConnection"/>
    <Edge id="77E1DD83AE5F471EB90F9747CB45BE03"
        fromID="1704DE5D1C004FA2AD97D03CFC41A4C7"
        toID=" AF61FD7FFE554B9EA09F44550C4B9665"
        edgeLabel="NYRS.LonRS"
        edgeClass="Replication Route"
        edgeIcon="RepRoute"/>
    <Edge id="F474357E79804FF485BBEDC125633C05"
        fromID=" AF61FD7FFE554B9EA09F44550C4B9665"
        toID=" E62E9FAEEAF94C789BEC9CFF391C5EDB"
        edgeLabel="LondonEX.TradeDB"
        edgeClass=" Replication Server Connection"
        edgeIcon="RepServerConnection "/>
    <Path id="803326B1CD5F40E3AF283BD2CF9C2F48">
        <Server id="9401F983DFA143C4AE763FF0C739E62D "/>
        <Server id="1704DE5D1C004FA2AD97D03CFC41A4C7"/>
        <Server id="AF61FD7FFE554B9EA09F44550C4B9665"/>
        <Server id=" E62E9FAEEAF94C789BEC9CFF391C5EDB "/>
</Graph>
```

Thus, the XML is generated in order to display the replication topology. It includes the definition of replication paths which are used in generating the tracing display. By way of example, FIG. 5 illustrates a topology 500 displaying the managed objects for the example environment. While the icons are automatically arranged in the topology, an option exists for the user to re-organize the topology by dragging and dropping the server icons, as is well appreciated by those skilled in the art.

In creating the topology, the status from each of the selected servers is retrieved, as well as the list of connections and routes for each replication server, and the database information for each replication agent. The status of each connection and route is also retrieved. An icon is placed on the topology view for each of the servers, and lines are drawn between the icons that represent the connections and routes in the environment. The icons and lines reflect the status of the servers, connections, and routes.

In order to provide rendering of the data flow with the topology, a tracing attribute is defined on the node and edge objects. This allows for different tracing displays to be created dynamically (at the user's request) on the same base replication topology display. In an embodiment, an initial, default value of the tracing attribute is "false", with the value changed to "true" when the element should be "highlighted" for a tracing display. Also, a state named "highlight" is added to the node and edge renderers. In an embodiment, this state renders the object with a light yellow "glow". In general, "highlight" refers to the providing of a visually distinct representation of the elements, such as through use of a different color (e.g., yellow) and/or movement (e.g., flashing), or the like, as is well understood in the art. Thus, if the rendered object's highlight attribute is set to true the highlight state will be used to display the object in the topology view to present the user with a display showing each object identified in a traced path highlighted, where the Adobe Flex RIA environment supports adding the "glow" to the existing display without changes to the underlying XML data source and without a redraw, as is commonly understood. The tracing process also produces a text list representation of the highlighted paths.

When an event is generated and captured to call the associated tracing function, the nodes and edges to be traced are identified from the existing topology XML, and the tracing attributes of these nodes and edges are set to true.

Figure 6A:
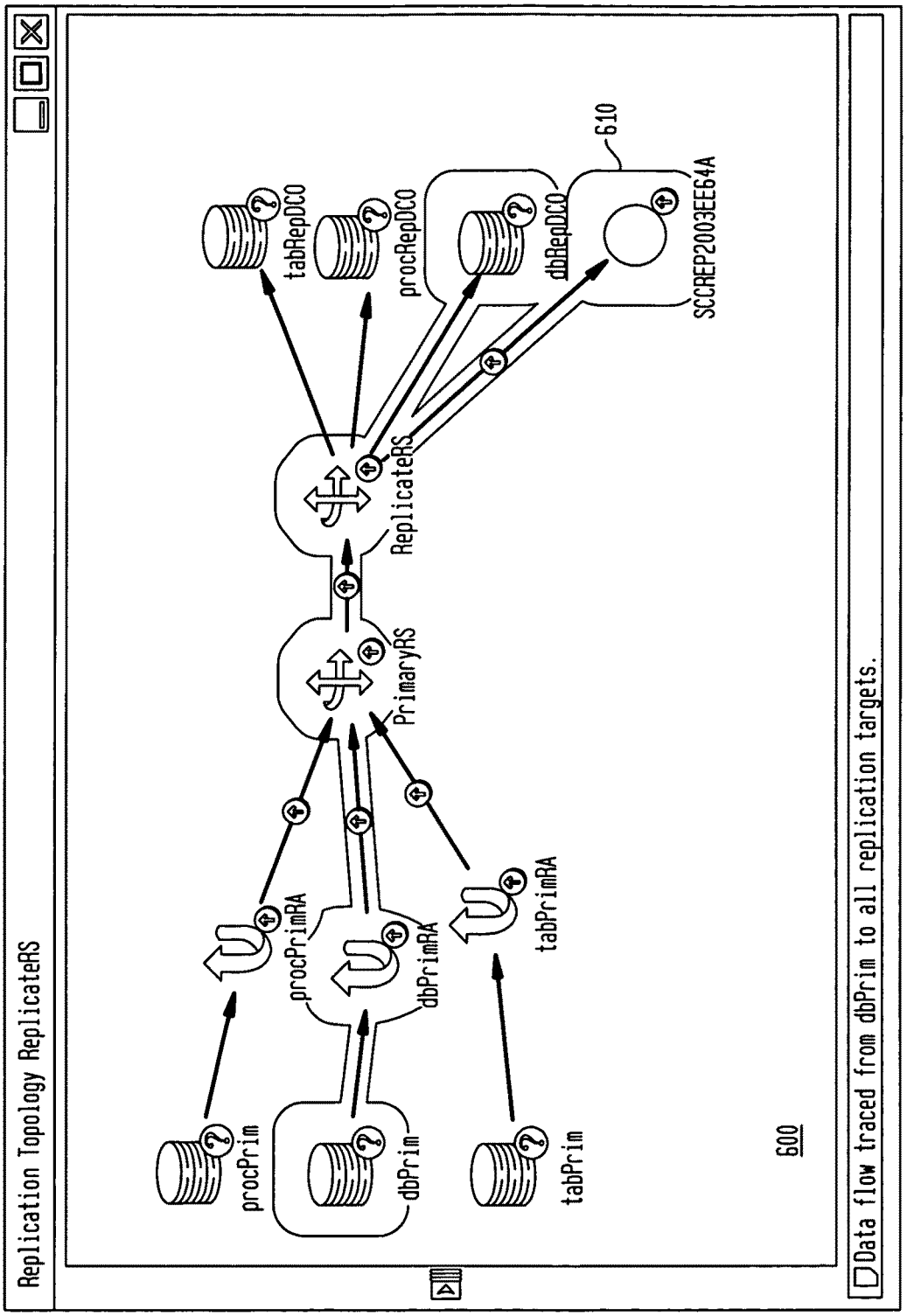
FIGS. 6a and 6b illustrate example screen shots of a topology with tracing of the data flow from a replication server back to all replication sources and from a database to all replication targets, respectively, in accordance with an embodiment of the invention.
Figure 6B:
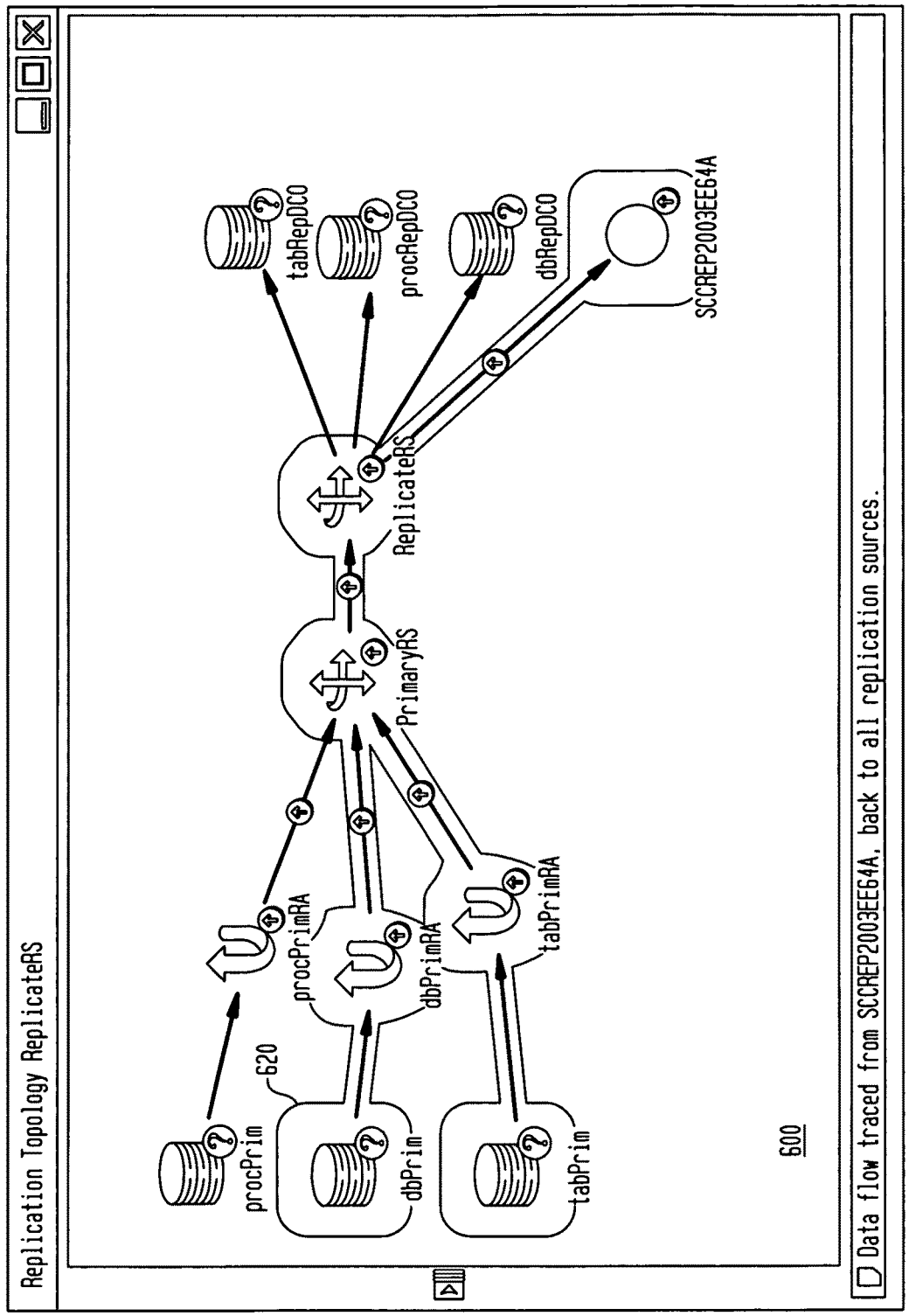

By way of example, FIG. 6a illustrates an example screen shot of a topology 600 with tracing of the data flow from a replication server 610 back to all replication sources, where the path is traced and rendered using desired highlighted, shown via shadowing in the figure. FIG. 6b illustrates tracing of the data flow from a database 620 to all replication targets in another example screen shot of the topology 600. As demonstrated, replication tracing provides the information needed to determine the target, source, and path of data flow anywhere in the replication environment, allowing ready determination of where is the data being replicated to (target tracing), where the data comes from (source tracing), and/or what the impact is to replication if a particular replication server is down (replication server tracing), which eases troubleshooting for the user. In an embodiment, a panel is made visible in a pane of the topology view to display a list of server names participating in the traced data path shown in the topology when a tracing is displayed.

Figure 7:
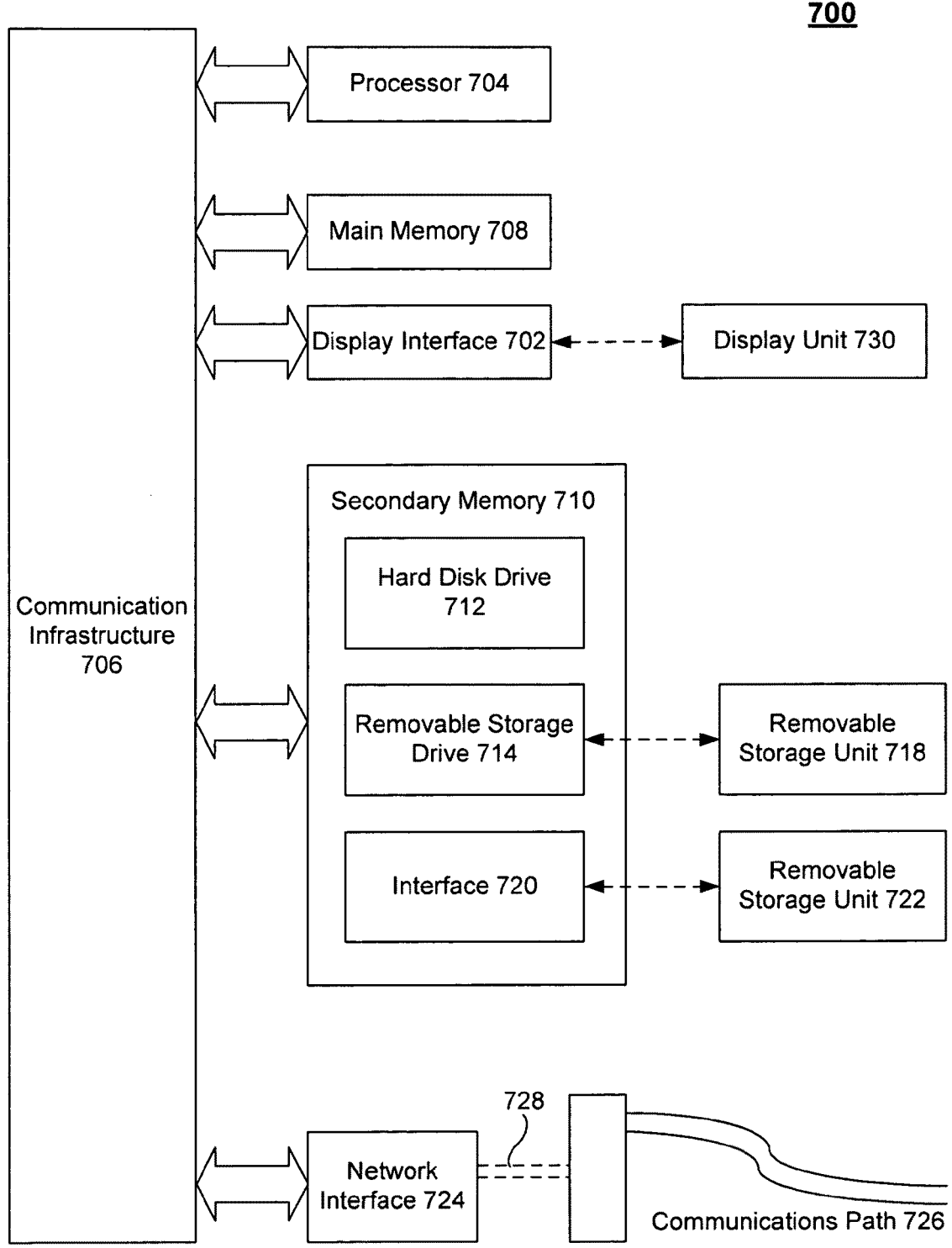
FIG. 7 illustrates an example computer useful for implementing components of embodiments of the invention.

FIG. 7 illustrates an example computer system 700 in which the present invention, or portions thereof, can be implemented as computer-readable code. For example, the methods illustrated by flowchart of FIG. 3, can be implemented in system 700. Various embodiments of the invention are described in terms of this example computer system 700. After reading this description, it will become apparent to a person skilled in the relevant art how to implement the invention using other computer systems and/or computer architectures.

Computer system 700 includes one or more processors, such as processor 704. Processor 704 can be a special purpose or a general purpose processor. Processor 704 is connected to a communication infrastructure 706 (for example, a bus or network).

Computer system 700 also includes a main memory 708, preferably random access memory (RAM), and may also include a secondary memory 710. Secondary memory 710 may include, for example, a hard disk drive 712, a removable storage drive 714, and/or a memory stick. Removable storage drive 714 may comprise a floppy disk drive, a magnetic tape drive, an optical disk drive, a flash memory, or the like. The removable storage drive 714 reads from and/or writes to a removable storage unit 718 in a well known manner. Removable storage unit 718 may comprise a floppy disk, magnetic tape, optical disk, etc. which is read by and written to by removable storage drive 714. As will be appreciated by persons skilled in the relevant art(s), removable storage unit 718 includes a computer usable storage medium having stored therein computer software and/or data.

In alternative implementations, secondary memory 710 may include other similar means for allowing computer programs or other instructions to be loaded into computer system 700. Such means may include, for example, a removable storage unit 722 and an interface 720. Examples of such means may include a program cartridge and cartridge interface (such as that found in video game devices), a removable memory chip (such as an EPROM, or PROM) and associated socket, and other removable storage units 722 and interfaces 720 which allow software and data to be transferred from the removable storage unit 722 to computer system 700.

Computer system 700 may also include a communications interface 724. Communications interface 724 allows software and data to be transferred between computer system 700 and external devices. Communications interface 724 may include a modem, a network interface (such as an Ethernet card), a communications port, a PCMCIA slot and card, or the like. Software and data transferred via communications interface 724 are in the form of signals which may be electronic, electromagnetic, optical, or other signals capable of being received by communications interface 724. These signals are provided to communications interface 724 via a communications path 726. Communications path 726 carries signals and may be implemented using wire or cable, fiber optics, a phone line, a cellular phone link, an RF link or other communications channels.

In this document, the terms "computer program medium" and "computer usable medium" are used to generally refer to media such as removable storage unit 718, removable storage unit 722, and a hard disk installed in hard disk drive 712. Signals carried over communications path 726 can also embody the logic described herein. Computer program medium and computer usable medium can also refer to memories, such as main memory 708 and secondary memory 710, which can be memory semiconductors (e.g. DRAMs, etc.). These computer program products are means for providing software to computer system 700.

Computer programs (also called computer control logic) are stored in main memory 408 and/or secondary memory 710. Computer programs may also be received via communications interface 724. Such computer programs, when executed, enable computer system 700 to implement the present invention as discussed herein. In particular, the computer programs, when executed, enable processor 704 to implement the processes of the present invention, such as the method illustrated by the flowchart of FIG. 3. Accordingly, such computer programs represent controllers of the computer system 700. Where the invention is implemented using software, the software may be stored in a computer program product and loaded into computer system 700 using removable storage drive 714, interface 720, hard drive 712 or communications interface 724.

The invention is also directed to computer program products comprising software stored on any computer useable medium. Such software, when executed in one or more data processing device, causes a data processing device(s) to operate as described herein. Embodiments of the invention employ any computer useable or readable medium, known now or in the future. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, optical storage devices, MEMS, nanotechnological storage device, etc.), and communication mediums (e.g., wired and wireless communications networks, local area networks, wide area networks, intranets, etc.).

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. It should be understood that the invention is not limited to these examples. The invention is applicable to any elements operating as described herein. Accordingly, the breadth and scope of the present invention should not be limited by any of the above-described exemplary embodiments, but should be defined only in accordance with the following claims and their equivalents.

What is claimed is:

1. A method for data replication tracing comprising:
identifying a replication environment within a multi-tier infrastructure of an enterprise data processing network, the replication environment comprising source servers and replication servers and connections between the source and replication servers, and managed objects passed between the source and replication servers;
receiving a selection of one of the managed objects for which a replication path is to be dynamically determined;
dynamically determining, responsive to the selection, the replication path for the selected managed object, wherein the replication path comprises at least one source server and at least one replication server of the replication environment over which one or more transactions traverse from the at least one source server to the at least one replication server, and wherein the replication path is dynamically determined between the source server and the replication server associated with the selected managed object even if one or both of the source server and the replication server associated with the selected managed object are down; and
rendering the replication path for the selected managed object on a topology to display data flow for replication of the selected managed object within the replication environment independent of whether any server of the replication environment is offline.

2. The method of claim 1 further comprising:
monitoring operational performance within the replication environment; and
utilizing a central control system of the enterprise data processing network for the monitoring.

3. The method of claim 1 wherein rendering the replication path further includes forming the topology as a plurality of nodes representing members in the replication environment and edges representing connections among the members.

4. The method of claim 3 further comprising utilizing a markup language to establish the nodes and edges, including an ordered set of nodes for the replication path.

5. The method of claim 3 further comprising controlling the rendering based upon attributes of the nodes and edges.

6. The method of claim 1 wherein the replication path represents a tracing of replication data flow relative to a target data node.

7. The method of claim 1 wherein the replication path represents a tracing of replication data flow relative to a source data node.

8. The method of claim 1 wherein the replication path represents a tracing of replication data flow relative to the at least one replication server.

9. The method of claim 1 wherein rendering the replication path further comprises displaying the data flow on the topology through visually distinct highlighting.

10. A system for data replication tracing comprising:
an enterprise data processing network having a multi-tier infrastructure, a replication environment including source and replication servers and connections between the source servers and the replication servers, and managed objects passed between the source and replication servers, the multi-tier infrastructure including:
a processor and a memory;
a control center system tier implemented using said processor and memory to:
monitor operational performance within a replication environment of a managed resources tier;
receive a selection of one of the managed objects for which a replication path is to be dynamically determined between one of the source servers associated with the selected managed object and one of the replication servers associated with the selected managed object;
dynamically determine, responsive to the selection, the replication path for the selected managed object, wherein the replication path comprises at least one source server and at least one replication server of the replication environment over which one or more transactions traverse from the at least one source server to the at least one replication server, and wherein the replication path is dynamically determined between the source server and the replication server associated with the selected managed object even if one or both of the source server and the replication server associated with the selected managed object are down; and
render the replication path for the selected managed object on a topology to display data flow for the replication of the selected managed object within the replication environment independent of whether any server of the replication environment is offline.

11. The system of claim 10 wherein the topology further includes a plurality of nodes representing members in the replication environment and edges representing connections among the members.

12. The system of claim 11 wherein the nodes and edges, including an ordered set of nodes for the replication path, are established with a markup language.

13. The system of claim 11 wherein the rendering is controlled based upon attributes of the nodes and edges.

14. The system of claim 10 wherein the replication path represents a tracing of replication data flow relative to a target data node.

15. The system of claim 10 wherein the replication path represents a tracing of replication data flow relative to a source data node.

16. The system of claim 10 wherein the replication path represents a tracing of replication data flow relative to the at least one replication server.

17. The system of claim 10 wherein the data flow on the topology is displayed through visually distinct highlighting.

18. A computer program product including a non-transitory computer-readable medium having instructions stored thereon that, if executed by a computing device, cause the computing device to perform operations for data replication tracing, the instructions comprising:
identifying a replication environment within a multi-tier infrastructure of an enterprise data processing network, the replication environment including source and replication servers and connections between the source servers and the replication servers, and managed objects passed between the source and replication servers;
monitoring operational performance within the replication environment;
receiving a selection of one of the managed objects for which a replication path is to be dynamically determined between one of the source servers associated with the selected object and one of the replication servers associated with the selected object;
dynamically determining, responsive to the selection, the replication path for the selected managed object, wherein the replication path comprises at least one source server and at least one replication server of the replication environment over which one or more transactions traverse from the at least one source server to the at least one replication server, and wherein the replication path is dynamically determined between the source server and the replication server associated with the selected managed object even if one or both of the source server and the replication server associated with the selected managed object are down; and rendering the replication path for the selected object on a topology to display data flow for the replication of the selected managed object within the replication environment independent of whether any server of the replication environment is offline.

19. The computer program product of claim 18 wherein rendering the replication path further includes forming the topology as a plurality of nodes representing members in the replication environment and edges representing connections among the members, and controlling the rendering based upon attributes of the nodes and edges.

20. The computer program product of claim 18 wherein the replication path represents at least one of a tracing of replication data flow relative to a target data node, a tracing of replication data flow relative to a source data node, and a tracing of replication data flow relative to the at least one replication server.

21. The method of claim 1, wherein the dynamically determining comprises determining multiple replication paths flowing through the replication server.

22. The method of claim 1, wherein the dynamically determining comprises determining which applications and users would be affected by a downtime of the servers.

* * * * *